United States Patent
D'Amato et al.

(10) Patent No.: US 10,691,087 B2
(45) Date of Patent: Jun. 23, 2020

(54) SYSTEMS AND METHODS FOR BUILDING A MODEL-BASED CONTROL SOLUTION

(71) Applicant: General Electric Company, Schenectady, NY (US)

(72) Inventors: Fernando Javier D'Amato, Niskayuna, NY (US); Catherine Mary Graichen, Malta, NY (US); Ramu Sharat Chandra, Dublin, CA (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 292 days.

(21) Appl. No.: 15/827,352

(22) Filed: Nov. 30, 2017

(65) Prior Publication Data
US 2019/0163147 A1    May 30, 2019

(51) Int. Cl.
| | |
|---|---|
| *G05B 17/02* | (2006.01) |
| *G05B 19/418* | (2006.01) |
| *G06F 8/35* | (2018.01) |
| *G06F 11/36* | (2006.01) |
| *G06F 17/16* | (2006.01) |
| *G05B 13/04* | (2006.01) |
| *G06F 8/36* | (2018.01) |

(52) U.S. Cl.
CPC ....... *G05B 17/02* (2013.01); *G05B 19/41885* (2013.01); *G06F 8/35* (2013.01); *G06F 11/3604* (2013.01); *G06F 17/16* (2013.01); *G05B 13/04* (2013.01); *G06F 8/36* (2013.01)

(58) Field of Classification Search
CPC .......................... G05B 19/41885; G05B 19/05
See application file for complete search history.

(56) References Cited

U.S. PATENT DOCUMENTS

| | | | |
|---|---|---|---|
| 7,412,367 B1 * | 8/2008 | Warlock | G06F 17/504 703/20 |
| 7,680,637 B1 | 3/2010 | Wolodkin | |
| 7,739,081 B1 * | 6/2010 | Kierzenka | G06F 17/13 703/2 |
| 9,075,959 B2 | 7/2015 | Chouinard et al. | |
| 2004/0098148 A1 | 5/2004 | Retlich et al. | |

(Continued)

OTHER PUBLICATIONS

C. Lubich, "Linearly implicit extrapolation methods for differential-algebraic systems", Numerische Mathematik, Mar. 1989, vol. 55, Issue 2, pp. 197-211.

(Continued)

*Primary Examiner* — Mohammad Ali
*Assistant Examiner* — Vincent W Chang
(74) *Attorney, Agent, or Firm* — Buckley, Maschoff & Talwalker LLC

(57) ABSTRACT

A method for building a model-based control solution is disclosed. The method includes obtaining, via a model-based control definition sub-unit, a first set of component models from a component model library and defining, via the model-based control definition sub-unit, a system model by interconnecting the first set of component models. Also, the method includes obtaining, via the model-based control definition sub-unit, a first model-based analytic algorithm from a model-based analytic algorithm library and associating, via the model-based control definition sub-unit, the first model-based analytic algorithm with the system model to generate the model-based control solution.

20 Claims, 9 Drawing Sheets

(56) References Cited

U.S. PATENT DOCUMENTS

| | | |
|---|---|---|
| 2005/0066241 A1 | 3/2005 | Gross et al. |
| 2011/0145653 A1 | 6/2011 | Broadfoot et al. |
| 2012/0198547 A1 | 8/2012 | Fredette et al. |
| 2012/0272209 A1 | 10/2012 | Biglari et al. |
| 2014/0094938 A1 | 4/2014 | Kihas |
| 2016/0357166 A1* | 12/2016 | Rehor .................... G06F 17/50 |

OTHER PUBLICATIONS

Wenger et al., "Industrial Embedded Model Predictive Controller Platform", IEEE 16th Conference on Emerging Technologies & Factory Automation, Sep. 5-9, 2011.

Hossain et al., "Virtual Control System Development Platform with the Application of PLC Device", Proceedings of the International Multi Conference of Engineers and Computer Scientists, vol. 2, Mar. 13-15, 2013.

Deliparaschos et al., "A Model-Based Embedded Control Hardware/Software Co-Design Approach for Optimized Sensor Selection of Industrial Systems", 23th Mediterranean Conference on Control and Automation, Jun. 16-19, 2015.

* cited by examiner

SYSTEMS AND METHODS FOR BUILDING A MODEL-BASED CONTROL SOLUTION

BACKGROUND

Embodiments of the present specification relate generally to the generation and deployment of model-based control solutions for industrial control systems, and more particularly, to model-based control platforms for industrial control systems.

Industrial control software platforms have traditionally been effective in providing tools to design, implement, and deploy controllers for industrial assets in a robust and efficient manner. For example, in industries such as oil and gas processing or power generation, the use of software platforms that support programmable logic controller (PLC) languages specified in standard IEC 61131-3 are very effective for development of a controller. Many industrial assets require a controller capable of a wide range of tasks, having flexibility to handle customizations and adaptation to address problems of degradation, plant configuration changes, hardware upgrades, and temporary modifications to a control logic to solve operability issues. Software platforms enable such modifications through a modular architecture, which offer a rich set of primitive modules for logic building and a graphical user interface that allows different combinations of primitive modules to be removed or added to overall control code in a flexible manner.

In platforms supporting PLC languages, the primitive modules or primitives are precompiled libraries having tested and reusable code. In extant methods, a user may modify any combination of primitive modules through the graphical user interface. The modified control logic is deployed to the control hardware. After a user finalizes customizations and modifications, the data for the new configuration is downloaded to the control hardware. It may be noted that the executable code for each primitive module is unchanged and there is no new code generation needed to perform modified runtime operations. In one example, the primitive modules may include simple operations between signals, ladder logic, integrators, differentiators, lead-lag compensators and digital filters. Configuration data is created or modified to specify linkages between the primitive modules, the manner in which sensor signals are fed to the controller, and the manner in which actuator commands are issued to each actuator. The combination of the primitive modules, configuration data, and the user interface enables a control engineer to make quick modifications in the control code even after installation, obviating the need for low-level programming tools, code generation or compiling processes that could significantly delay implementation.

Model-Based Controls (MBC) are a set of techniques typically adopted to improve control performance. Generally, MBCs refer to control algorithms that make explicit use of a model of a system to be controlled to generate accurate and well-informed control actions. MBCs may include, but not be limited to, techniques like state estimation, model-based fault detection, diagnostics and accommodation, model-based degradation tracking, linear quadratic regulation, robust control, gain scheduling, dynamic inversion, model predictive control, and variations thereof. MBC techniques may enable significant performance improvements. However, the use of MBC techniques in industrial control platforms is usually very limited. As a result, a control engineer may need to repeat multiple stages of programming scripts, compilation tools, and code generation processes, entailing a relatively long and expensive development process and the need of a workforce with additional skills.

BRIEF DESCRIPTION

In accordance with one embodiment of the present invention, a method for building a model-based control solution is disclosed. The method includes obtaining, via a model-based control definition sub-unit, a first set of component models from a component model library and defining, via the model-based control definition sub-unit, a system model by interconnecting the first set of component models. Also, the method includes obtaining, via the model-based control definition sub-unit, a first model-based analytic algorithm from a model-based analytic algorithm library and associating, via the model-based control definition sub-unit, the first model-based analytic algorithm with the system model to generate the model-based control solution.

In accordance with another embodiment of the present invention, a system is disclosed. The system includes a model-based control platform including a processor sub-unit, a memory sub-unit operatively coupled to the processor sub-unit, a component model library, a model-based analytic algorithm library, and a model-based control definition sub-unit operatively coupled to the processor sub-unit. The model-based control definition sub-unit is configured to obtain a first set of component models from the component model library and define a system model by interconnecting the first set of component models. Additionally, the model-based control definition sub-unit is configured to obtain a first model-based analytic algorithm from the model-based analytic algorithm library and associate the first model-based analytic algorithm with the system model to generate a model-based control solution. Further, the system includes a validation subsystem communicatively coupled to the model-based control platform, wherein the validation subsystem is configured to validate the generated model-based control solution, via a simulation of the model-based analytic algorithm and the system model. Furthermore, the system includes an industrial control subsystem communicatively coupled to the model-based control platform and configured to execute the model-based control solution based on validation of the generated model-based control solution.

In accordance with yet another embodiment of the present invention, a non-transitory computer readable medium is disclosed. The non-transitory computer readable medium includes instructions to enable at least one processor to obtain a first set of component models from a component model library and define a system model by interconnecting the first set of component models. The non-transitory computer readable medium also includes instructions enabling the at least one processor module to obtain a first model-based analytic algorithm from a model-based analytic algorithm library and associate the first model-based analytic algorithm with the system model to generate the model-based control solution.

DRAWINGS

These and other features and aspects of embodiments of the present specification will become better understood when the following detailed description is read with reference to the accompanying drawings in which like characters represent like parts throughout the drawings, wherein.

DETAILED DESCRIPTION

Figure 1A:
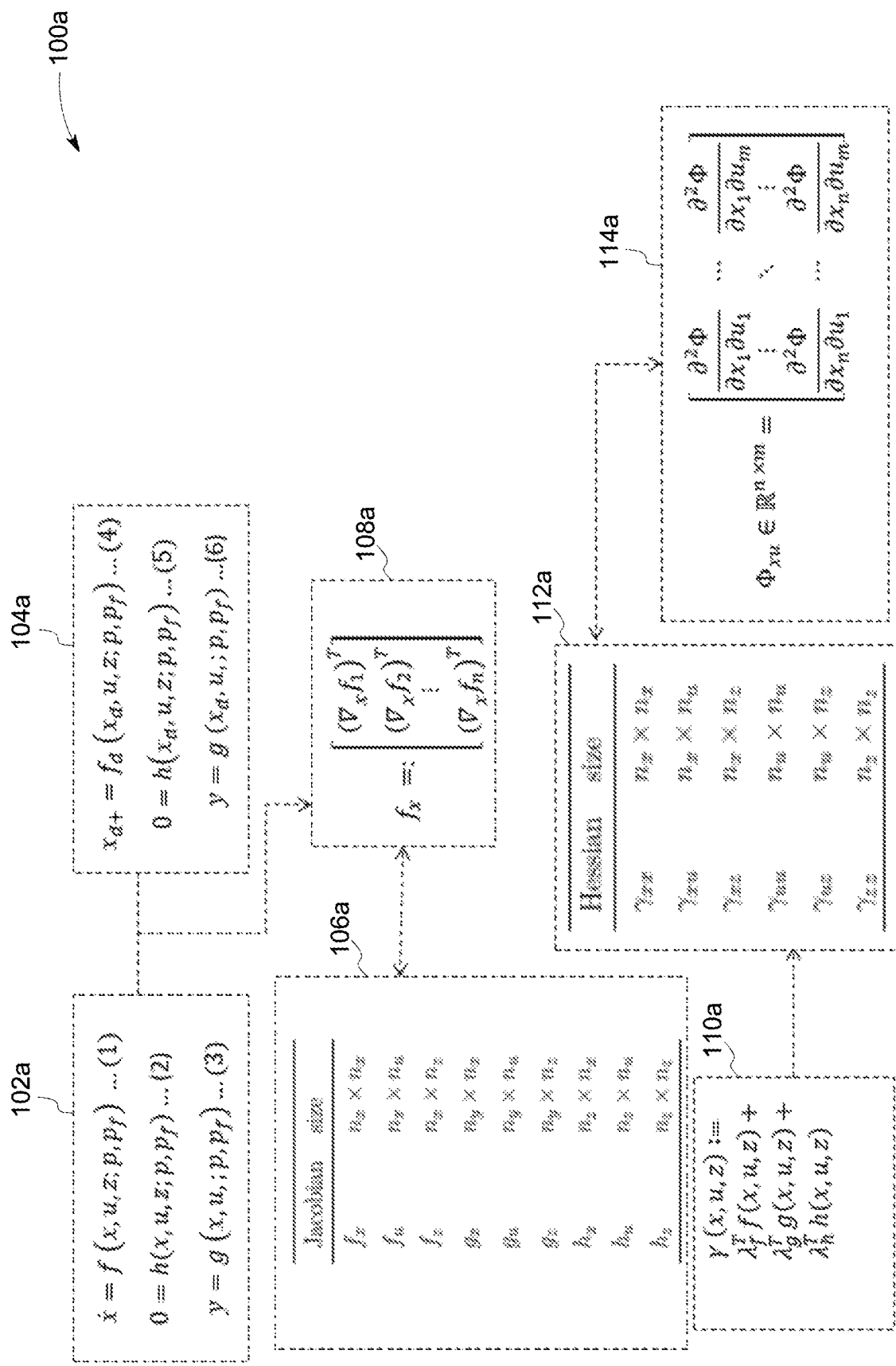
FIG. 1A is a block diagram illustrating exemplary definitions of component models and exemplary first order and second order derivative information associated with the component models in accordance with an embodiment of the present invention.

As will be described in detail hereinafter, various embodiments of exemplary platforms for providing model-based control solutions for industrial control systems are disclosed. In an effort to provide a concise description of these embodiments, all features of an actual implementation may not be described in the specification.

When describing elements of the various embodiments of the present specification, the articles "a", "an", "the" and "said" are intended to mean that there are one or more of the elements. The terms "comprising", "including" and "having" are intended to be inclusive and mean that there may be additional elements other than the listed elements.

Moreover, when describing various aspects of the present specification, the term "runtime" may be used to refer to a segment of an executable code that is generated when software programs or subroutines are compiled. Also, the terms "runtime library", "software library", and "software runtime library", may be used interchangeably in the present specification and are used to refer to a collection of one or more runtimes as defined hereinabove. By way of example, a component model may be represented as a primitive module. The primitive module may be defined by a software program or set of subroutines. When the software program or the set of subroutines is compiled, a segment of the executable code is generated. The segment may either run as a stand-alone executable software program, or as part of another executable software program. A component model library may refer to a runtime library or a software library including one or more runtimes of component models. A function library may refer to a runtime library or a software library including one or more runtimes of analytic functions or algorithms. It may also be noted that the terms "analytic function" and "analytic algorithm" may be used interchangeably when describing various aspects of the present specification.

Additionally, the term "interconnected" refers to an exchange of information and parameters between component models selected to create a system model. The information exchange may include, but not be limited to, input and output signals, state estimation parameters, and the like. Further, the terms "interconnection" or "interconnected" as used in the present specification, may refer to linkage(s) between component models characterized by required result-effective information exchange between the component models. In one embodiment, the linkage between the component models is characterized by configuration data and computer code. The configuration data for each of the component models may include inputs, outputs, model attributes, and the like. By way of example, the model attributes can include grid spacing for finite difference models resulting from simplification of models naturally expressed as partial differential equations. Other non-limiting examples of model attributes may include material properties of steam, gas, steel alloys, and the like. In certain examples, inputs may be representative of sensor signals, signal properties, model uncertainty, estimation tuning, and the like. In some examples, outputs may be representative of actuators, actuator signal properties, control objectives, and the like.

As previously noted, component models may be represented as primitive modules which include computer software code for implementing certain calculations or modeling operations. A component model may be defined based on at least one system equation representing underlying physics, at least one input and at least one output. Component models may include computer software code implementing domain-specific models characterized by equations representing the underlying physics. Component models may also include generic models that can be adapted to a plurality of components by using data to adjust model coefficients. By way of example, in the context of a thermal power plant, the physics-based component models may be representative of valves, water pipes, gas turbines, steam turbines, drums, heat exchangers, and the like. In another example, a generic model may be represented by a neural network model representative of a combustion process.

As will be appreciated, component models may further compute linear and quadratic approximations of model behavior around one or more operating points. In certain embodiments, an operating point may refer to the initial states and root-level input signals of the component model at a particular time. In certain embodiments, linear approximations, such as Jacobians, representing derivatives of component model outputs may be employed in model-based control algorithms, such as, but not limited to, linear quadratic regulator controllers and model predictive controls to evaluate suitable actuator commands or suitable estimator gains. Further, quadratic or second-order approximations, typically model Hessians, may be employed in model-based optimization to enable convergence.

In certain embodiments of the present specification, a system architecture defining new primitive modules and new user interfaces that operate on such primitive modules is presented. The primitive modules implemented are generally representative of one or more component models and functions or algorithms that may be combined to build an MBC solution. Such primitive modules are implemented as precompiled software libraries or runtime libraries. The exemplary system permits operations on the primitive modules in a flexible manner by combining and modifying the primitive modules to generate or build MBC solutions, thereby obviating the need to recourse to low level programming, compiling, or code generation processes.

FIG. 1A shows a block diagram 100a illustrating exemplary definitions of component models and associated exemplary first order and second order derivative information. The block diagram 100a includes component model definition blocks 102a, 104a used to generate a table of Jacobian matrices representing exemplary first order derivative information represented by a block 106a. An equation used to define the matrices of each row of the table of the block 106a is represented by a block 108a.

Second order derivative information associated with the component model definitions of blocks 102a, 104a are represented as a table of Hessian matrices by a block 112a. The Hessian matrices of the table shown in block 112a may be defined based on an exemplary scalar Lagrangean function represented by a block 110a. The equation used to define the matrices of each row of the table of the block 112a is shown by a block 114a.

A component model is the smallest modeling unit that may be defined by a model-based control definition sub-unit (not shown in FIG. 1A). The component model may represent a static or dynamic model. In one embodiment, the component model may be a representation of a continuous time model. In such an embodiment, the continuous time model may be defined in accordance with the component model definitions shown by the block 102a. With reference to component model definitions of the block 102a of diagram 100a, signal vectors are represented as follows: $x \in \mathbb{R}^{n_x}$ is a state vector, $u \in \mathbb{R}^{n_u}$ is an input vector, $y \in \mathbb{R}^{n_y}$ is an output vector, $z \in \mathbb{R}^{n_z}$ is an algebraic variable. Equation (1) of the block 102a is representative of a state equation wherein the function $f$ represents a rate of change of continuous time state vector, equation (2) of the block 102a is representative of an algebraic constraint equation, and equation (3) of the block 102a is representative of an output equation. In one embodiment, there are $n_x$ state equations and $n_z$ algebraic equations. Symbols $p \in \mathbb{R}^{n_p}$ and $p_f \in \mathbb{R}^{n_{fp}}$ respectively represent a vector of tunable parameters and a vector of fixed parameters. In another embodiment, the component model may be a representation of a discrete time model. In such an embodiment, the discrete time model may be defined in accordance with equations (4), (5), and (6) of the block 104a. It may be noted that the component model definitions of the block 104a are similar to the component model definitions of the block 102a, wherein the function $f_d$ represents a time update for a next discrete step and a discrete state is denoted by $x_d$. The symbols $x_d$, u, y and z are generally representative of the state, the input, the output and algebraic variables. Component models that are representative of continuous time state models and discrete time models may be combined to define a system model by interconnecting the component models.

The exemplary first-order derivative information of the component models of the block 102a or 104a, are represented by partial derivatives of functions $f$, $f_d$, g, and h with respect to arguments x, $x_d$, u and z, in accordance with the table shown by the block 106a. In one embodiment, a Jacobian matrix for a function $f(x)$ may be defined in accordance with a matrix definition shown by block 108a, wherein $f_i$ represents i-$^{th}$ entry of the function $f$, and $\nabla_x f_i$ is a gradient of the corresponding entry $f_i$ with respect to the argument x.

Further, the exemplary second-order derivative information of the component model definitions shown by the blocks 102a, 104a, is denoted by "Hessians". The exemplary second-order derivative information of the component model definitions represented by the blocks 102a, 104a may be associated with a Lagrangean scalar function defined by the scalar Lagrangean function represented by the block 112a. The exemplary second-order derivative information of the component model definitions of the blocks 102a, 104a may be represented by Hessian matrices in accordance with the table shown by the block 110a. The Hessian matrices may be defined based on the Lagrangean scalar function shown by the block 112a and Lagrange multiplier vectors $\lambda_f \in \mathbb{R}^{n_x}$, $\lambda_g \in \mathbb{R}^{n_y}$, $\lambda_f \in \mathbb{R}^{n_z}$, wherein matrices in each row of the table shown by the block 110a are defined in accordance with the equation shown by the block 114a. The equation shown by block 114a is representative of a second order derivative of a scalar multivariate function $\phi(x,u)$, $(x \in \mathbb{R}^n)$, and $(u \in \mathbb{R}^m)$. Exemplary object code and structures corresponding to component models and also system models and model-based analytic algorithms are described in greater detail with reference to FIG. 2B.

Figure 1B:
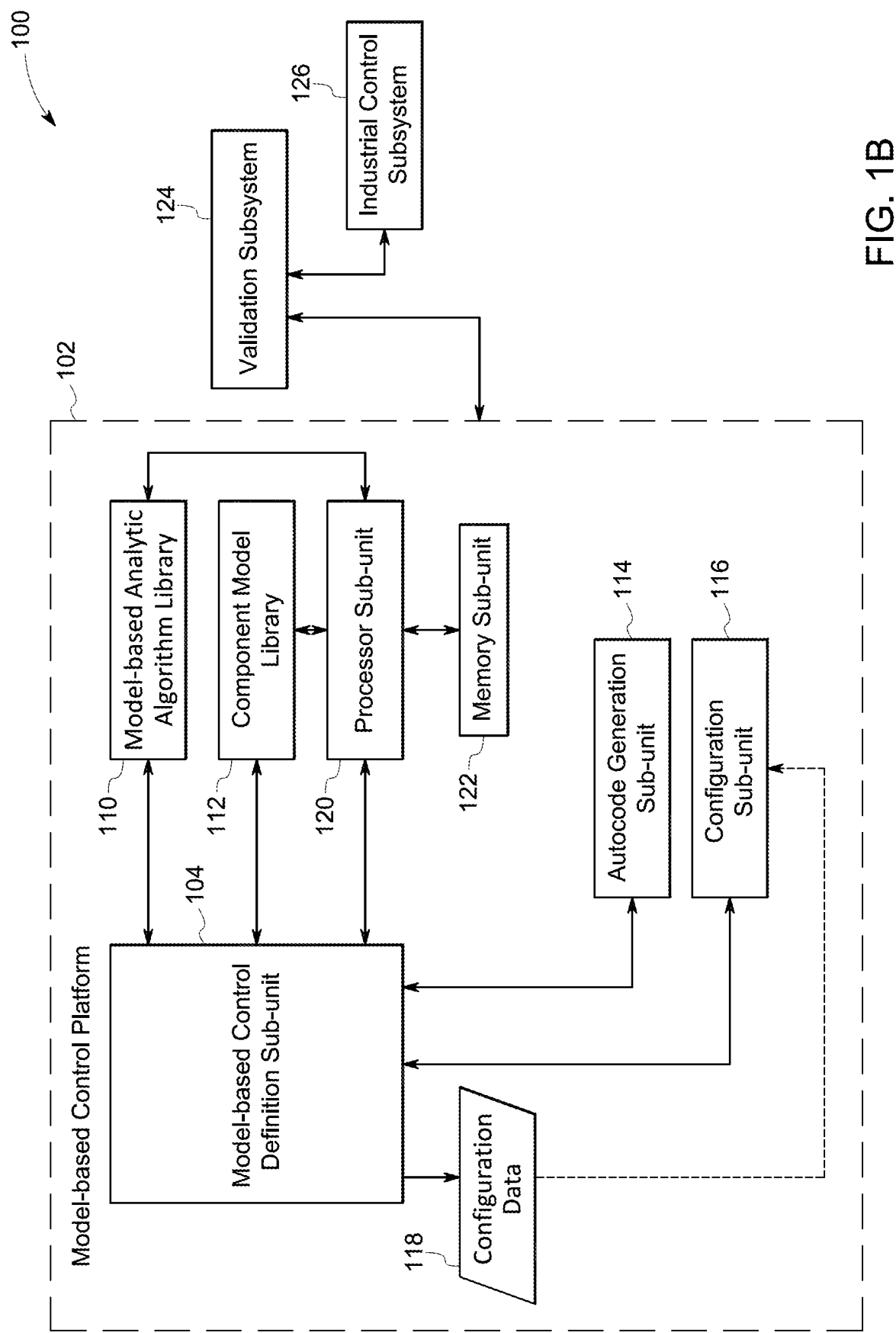
FIG. 1B is a block diagram of an exemplary industrial control system including a model-based control platform for generating a model-based control solution, in accordance with an embodiment of the present invention.

Turning now to FIG. 1B, an exemplary model-based control platform system 100 is illustrated in accordance with aspects of the present specification. The system 100 is generally representative of an industrial control system configured to generate, validate, deploy, and run model-based control solutions for industrial assets and processes. Some examples of industrial assets include, but are not limited to, gas turbines, wind turbines, artificial lifts, steam turbines and the like. The system 100 includes a model-based control platform (MBCP) 102, a validation subsystem 124, and an industrial control subsystem 126. The model-based control platform 102 is configured to generate model-based control solutions in the form of a system model and associated runtime. The validation subsystem 124 is communicatively coupled to the model-based control platform 102 and configured to perform a simulation of the system model runtime generated by the model-based control platform 102. Furthermore, the industrial control subsystem 126 is communicatively coupled to the validation subsystem 124 and configured to deploy and run the validated model-based control solution runtime generated by the model-based control platform 102.

In one embodiment, the validation subsystem 124 may be implemented as a set of instructions and/or software code and runtimes on a generic computer system. In one example, the validation subsystem 124 may be a software testing simulation environment. In another embodiment, the validation subsystem 124 may be implemented as a set of software services on a remote server which may be located in a datacenter or cloud. In one embodiment, the industrial control subsystem 126 may be an industrial computer system having hardware and system software configured to perform one or more specialized operations related to process or asset control in an industrial domain such as manufacturing, power generation, transportation, aviation, hydrocarbon production, and the like. Some non-limiting examples of the industrial controller subsystem 126 may include Distributed Control Systems (DCS), Supervisory Control and Data Acquisition (SCADA) systems, Programmable Logic Controllers (PLCs), and the like. Furthermore, in certain other embodiments, the industrial control subsystem 126 may include one or more embedded controllers attached to an industrial computer via a network.

As illustrated in FIG. 1B, the (MBCP) 102 includes a processor sub-unit 120 operatively coupled to a memory sub-unit 122. The processor sub-unit 120 is operatively coupled to a model-based control definition sub-unit (MBCDS) 104, a model-based analytic algorithm library (MBAAL) 110, and a component model library (CML) 112. The MBCDS 104 is further operatively coupled to an autocode generation sub-unit 114 and a configuration sub-unit 116.

In one embodiment, the MBAAL 110 and the CIVIL 112 may be runtime libraries. By way of example, the MBAAL 110 and the CIVIL 112 may store pre-compiled runtimes of one or more analytic functions and component models respectively. In certain embodiments, the MBCDS 104, the MBAAL 110, the CML 112, the autocode generation sub-unit 114, and the configuration sub-unit-116 may be implemented as software systems or computer instructions executable by the processor sub-unit 120 and stored in the memory sub-unit 122. The MBCDS 104, the MBAAL 110, the CIVIL 112, the autocode generation sub-unit 114, and the configuration sub-unit 116 may additionally or alternatively be stored and executed by other computing devices such as a workstation, personal computer (PC), laptop, notebook, tablet, cell phone, and the like. Further, MBCDS 104, the MBAAL 110, the CML 112, the autocode generation sub-unit 114, and the configuration sub-unit 116 may be implemented as hardware systems, for example, by field programmable gate arrays (FPGAs), custom chips, integrated circuits (ICs) and the like.

The MBCDS 104 is generally representative of a user interface and definition environment that enables users to interact with the MBCP 102. The MBCDS 104 receives user input at several instances during a process of generating a model-based control solution. The working of the MBCDS 104 will be explained in greater detail with reference to FIGS. 2-6. The MBCDS 104 is further communicatively coupled to the MBAAL 110 and the CIVIL 112. In one embodiment, a user may select component models via the MBCDS 104. Subsequent to the selection of the component models, the MBCDS 104 may obtain corresponding component model libraries from the CIVIL 112. The system model is defined based on interconnected component models. The MBCDS 104 is also configured to build a new component model software library module and runtime based on user selections defining the new component model, in conjunction with the autocode generator 114 configuration data 118 and the configuration sub-unit 116. As noted earlier, the configuration data 118 for each of the component models may include inputs, outputs, model attributes, and the like.

The MBCDS 104 is also configured to obtain one or more model-based analytic algorithms from the MBAAL 112. The one or more model-based analytic algorithms may be applied to the system model to obtain at least one outcome of the model-based control solution. By way of example, an Extended Kalman Filter (EKF) implemented as a model-based analytic algorithm, may be linked to the system model. In such an example, the required information during a runtime may include first-order derivative information, for example, Jacobians, corresponding to the EKF and state equations at each sample time interval in order to compute updated estimates of model states. Subsequent to the selection of the one or more model-based analytic algorithms by the user, the MBCDS 104 may obtain the corresponding model-based analytic algorithms from the MBAAL 110. Further, the MBCDS 104 is also configured to build a new model-based analytic algorithm software library module and runtime, based on user selections defining the algorithm parameters, such as inputs, outputs, kernel functions and the like, in conjunction with the autocode generator 114, configuration data 118 and the configuration sub-unit 116.

The system model runtime generated by the MBCP 102 may be tested by the validation subsystem 124. As previously noted, in one embodiment, the validation subsystem 124 is configured to run a simulation. In certain embodiments, the validation subsystem 124 may be configured to run a simulation by performing certain non-limiting steps, for example, specifying initial conditions for the simulation, for example, an initial state and initial values, specifying an output signal and other variables of interest, defining a desired relative or absolute accuracy threshold or margin for the simulation, wherein the difference between system model's variables of interest and the physical system's variable of interest is within a specified range of accuracy.

The MBCP 102 is configured to generate a model-based control solution by defining the system model based on the interconnected component models obtained from the CIVIL 112. The component models are selectable by a user via the MBCDS 104. In a similar manner, the model-based analytic algorithms applicable to the system model are selectable by a user via the MBCDS 104. Subsequently, the MBCP 102 generates the model-based control solution based on the system model defined from user-selected component models and model-based analytic algorithms. Further, the validation subsystem 124 is configured to test the model-based control solution by running a simulation of the model-based control solution. Finally, the MBCP 102 deploys the model-based control solution into the industrial control subsystem 126.

Turning now to FIG. 2, a flowchart illustrating an exemplary method 200 to generate a model-based control solution via the MBCP 102, in accordance with aspects of the present specification, is shown. The method 200 is described with reference to FIG. 1B.

In some embodiments, various steps of the method 200 of FIG. 2 are performed by the processor sub-unit 120 in conjunction with the memory sub-unit 122 and the MBCDS 104. More particularly, steps 202-210 are performed by the MBCDS 104 in conjunction with the processor sub-unit 120 and the memory sub-unit 122. Further, a step 212 of the method 200 is performed by the validation subsystem 124.

At step 202, a first set of component models is obtained from the CML 112, via the MBCDS 104. At step 204, a user defines the system model via the MBCDS 104 based on the first set of component models. The component models are interconnected based on configuration data and metadata corresponding to each component model. Specifically, a source component model is interconnected to a receiving component model. The term "source component model" refers to a component model from which an output signal is being generated and the term "receiving component model" refers to a component model which receives the output signal of the source component model as an input signal. In some embodiments, the interconnection between any two component models may be defined in a data structure including elements such as, but not limited to, an identification number of an input signal of a receiving component model, an identification number of the receiving component model, an identification number of a type of a signal of a source component model, an identification number of the source component model, an identification of a signal number of the source component model, and the like. As previously noted, the interconnection between the component models refers to the linkage between the component models characterized by a required result-effective information to be exchanged between the component models. The interconnection details corresponding to a component model may be defined by a user by manually creating an eXtensible Markup Language (xml) document or via the use of a plug-in interface of the MBCDS 104. The xml documents are used to create configuration information and metadata pertaining to complex hierarchical data structures and parameterized code. In one embodiment, a user creates an xml document defining the data structure corresponding to the interconnection as described hereinabove using established xml syntax and constructs. The detailed explanation of step 204 will be described with reference to FIG. 3A.

In some embodiments, the system model defined in step 204 may include, but not be limited to, the first set of component models, a system input parameter corresponding to a system input signal, a system output, and a system model function. In one example, the system input signal may be generally representative of a sensor signal from the physical system represented by the system model. The system output includes at least one of a system output parameter corresponding to a system output signal, a system-level continuous time state, a system-level discrete time state, and a system-level algebraic variable. In one example, the system output signal may be generally representative of a control output to be fed to an actuator in the physical system represented by the system model. The system model function includes one of a system output function corresponding to the system output parameter, a system-level rate-of-change of continuous time state vector corresponding to the system-level continuous time state, a system-level discrete time update function corresponding to the system-level discrete time state, and a system-level algebraic constraint function corresponding to the system-level algebraic variable. The system model may also include system metadata corresponding to the system input parameter and the system output, and system configuration data generated based on the system metadata. Further, the system model may also include a system-level first-order derivative corresponding to evaluation or computation of a first-order derivative function of the system model function. In a similar manner, the system model may also include a system-level second-order derivative corresponding to a second-order derivative function of the system model function. It may be noted that the terms "first-order derivative" and "second-order derivative", used in conjunction with the terms "system-level" and "component-level", refer to corresponding values obtained as a result of evaluation of the corresponding first-order derivative function and the second-order derivative function corresponding to the system model function. In one embodiment, the first-order derivative function may be obtained by differentiating the system model function and the second-order derivative function may be obtained by differentiating the first-order derivative function. Further, the system model may also include a system-level sparsity matrix identifying non-zero values of the system-level first-order derivative or the system-level second-order derivative.

In a similar manner, in certain embodiments, a component model may include, but not be limited to one or more component entities, namely, a component input parameter corresponding to a component input signal and a component output including at least one of a component output parameter corresponding to a component output signal, a component-level continuous time state, a component-level discrete time state, and a component-level algebraic variable. As described hereinabove with respect to the system model, in one example, the component input signal may be generally representative of a sensor input from a component of the physical system represented by the component model. In a similar manner, the component output may be generally representative of a control output to be fed to an actuator coupled to the component of the physical system represented by the component model. Further, the component entities may include a component model function including one of a component output function corresponding to the component output parameter, a component-level rate of change of continuous time state vector corresponding to the component-level continuous time state, a component-level discrete time update function corresponding to the component-level discrete time state, and a component-level algebraic constraint function corresponding to the component-level algebraic variable. Furthermore, the component entities may include component metadata corresponding to the component input parameter and the component output and component configuration data generated based on the component metadata. Additionally, in certain embodiments, the component entities may also include at least one of a component-level first-order derivative corresponding to the component model function, a component-level second-order derivative corresponding to the component model function, and a component-level sparsity matrix identifying non-zero values of the component-level first-order derivative or the component-level second-order derivative.

The terms "first", "second", and "new", used in conjunction with the terms "component model" and any of the component entities described hereinabove, are used to differentiate between different component models alluded to in the embodiments described in the current specification. In one example, a first component model may include a first component input parameter, a first component output, a first component-level first-order derivative, and the like. In a similar manner, a second component model may include a second component input parameter, a second component output, a second component-level first-order derivative, and the like. Furthermore, a new component model may include a new component input parameter, a new component output, a new component-level first-order derivative, and the like.

Subsequently at step 206, a first model-based analytic algorithm is obtained from the MBAAL 110 via the MBCDS 104. In certain embodiments, the first model-based analytic algorithm may include but not be limited to one or more model-based analytic algorithm entities, namely, an algorithm input parameter, an algorithm output parameter, and a kernel function. Further, the model-based analytic algorithm entities may include a place-holder or pointer data object or functional link, implemented in computer code, to the system model defined at step 204. Furthermore, the model-based analytic algorithm entities may include an association configuration parameter generated based on the system model, algorithm configuration data based on the algorithm input parameter, the algorithm output parameter, and the kernel function.

It may be noted that the terms "first" and "second" used in conjunction with the term "model-based analytic algorithm" and any of the model-based analytic algorithm entities described hereinabove, are used to differentiate between different model-based analytic algorithms alluded to in the embodiments described in the current specification. In one embodiment, a first model-based analytic algorithm may include a first algorithm input parameter, a first algorithm output parameter, a first kernel function and the like. In a similar manner, a second model-based analytic algorithm may include a second algorithm input parameter, a second algorithm output parameter, a second kernel function, and the like.

In certain embodiments, the kernel function corresponding to the first model-based analytic algorithm may be a state estimation function based on the algorithm input parameter, an input property corresponding to the algorithm input parameter, a system model uncertainty factor corresponding to the system model defined at step 204, and an estimation tuning factor. The kernel function may be defined via the MBCDS 104. In one embodiment, the algorithm input parameter may include a sensor value and the input property may correspond to the sensor signal. Further, some non-limiting examples of the state estimation function may include an Extended Kalman Filter (EKF), an Unscented Extended Kalman Filter (UKF), a Gauss-Newton filter and variations thereof. Some non-limiting examples of a system model uncertainty factor may include manufacturing tolerances and measurement gauge tolerances.

In certain other embodiments, the kernel function corresponding to the model-based analytic algorithm may be a control function, based on the algorithm output parameter, an output property corresponding to the algorithm output parameter, a control objective parameter, a constraint factor, and a controller tuning factor. Some non-limiting examples of control functions may include feed-forward functions, linear quadratic regulator functions, robust control functions, dynamic inversion functions, gain scheduling functions and the like. In one embodiment, the output parameter may include at least one actuator. The output property may be a property corresponding to an actuator signal. The control objective parameter may refer to one or more parameters that the control function may change to affect the performance of a physical system or asset that is controlled by the model-based control solution. Some non-limiting examples of control objective parameters may include a set point of megawatts to be generated on a gas turbine, a blade pitch actuator command for a wind turbine, an amount of acceleration or deceleration of a vehicle operating under cruise control, and the like. Further, the constraint factor may refer to limitations on the control objective parameter or other parameters of a physical system or an asset being controlled to maintain operations with desired ranges for reliability. Furthermore, the constraint factor may also include a rate of change allowed by the device to meet physical limitations of the operations. For example, a vehicle may not be able to speed up or slow down faster than a predefined rate. Additionally, the controller tuning factors may refer to a calculation used to perform a controller function.

Step 208 may be executed by the processor sub-unit 120 and memory sub-unit 122, in conjunction with the MBCDS 104. At step 208, the first model-based analytic algorithm is associated with the system model by defining the algorithm configuration data corresponding to the first model-based analytic algorithm based on the system input parameter and the system output parameter corresponding to the system model.

At step 210, the generated model-based control solution is validated by the validation subsystem 124, via a simulation of the first model-based analytic algorithm and the system model. In one embodiment, step 210 may entail the execution of the first model-based analytic algorithm and the system model via a simulation of the system model input parameter, the algorithm input parameter, and the algorithm output parameter. Further, at step 212, the generated model-based control solution is executed on the industrial control subsystem 126 based on the validation of the generated model-based control solution. More details of the step 212 will be explained with reference to FIG. 3B.

Figure 2A:
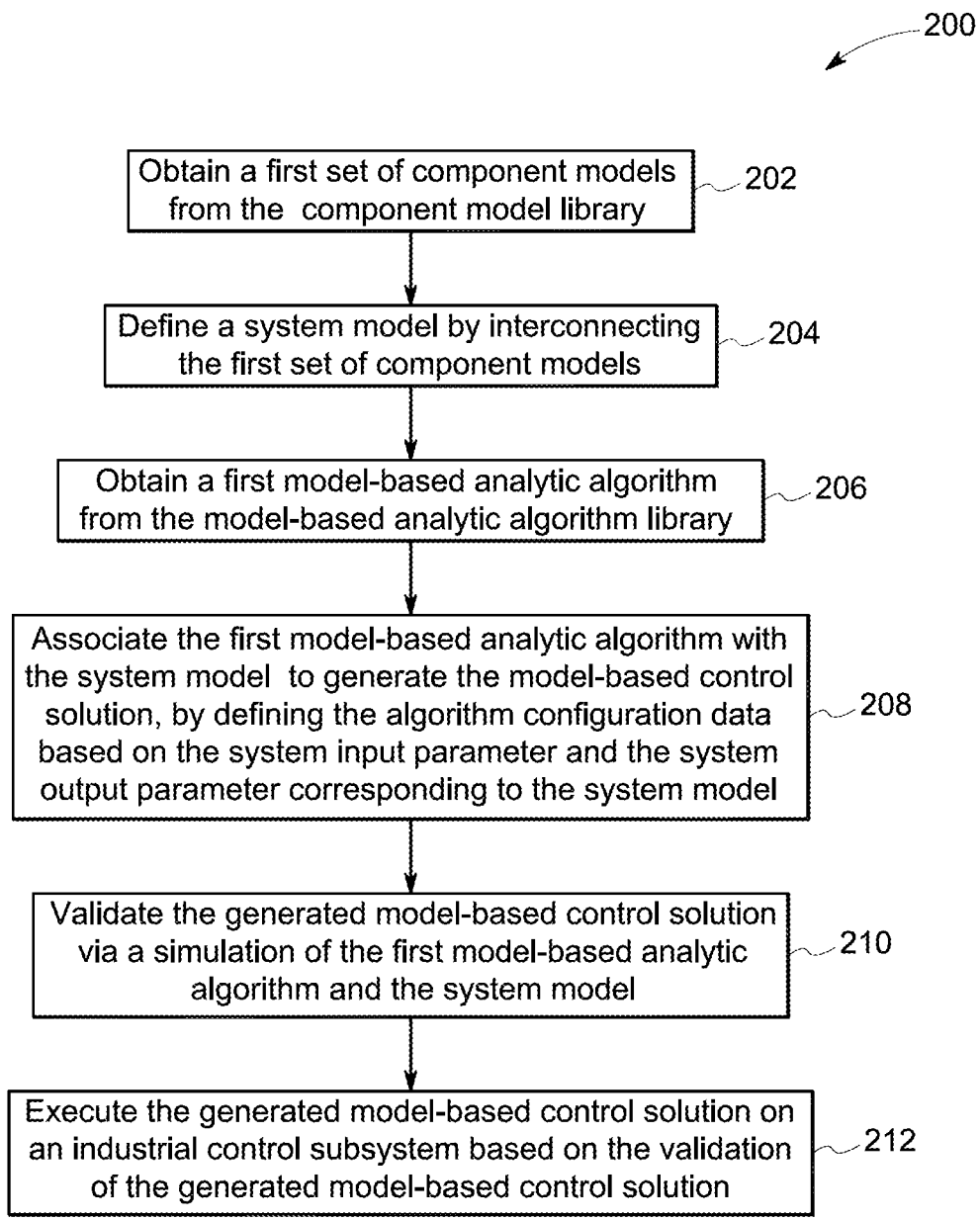
FIG. 2A is a flowchart illustrating a method for generating a model-based control solution via the model-based control platform in accordance with an embodiment of the present invention.
Figure 2B:
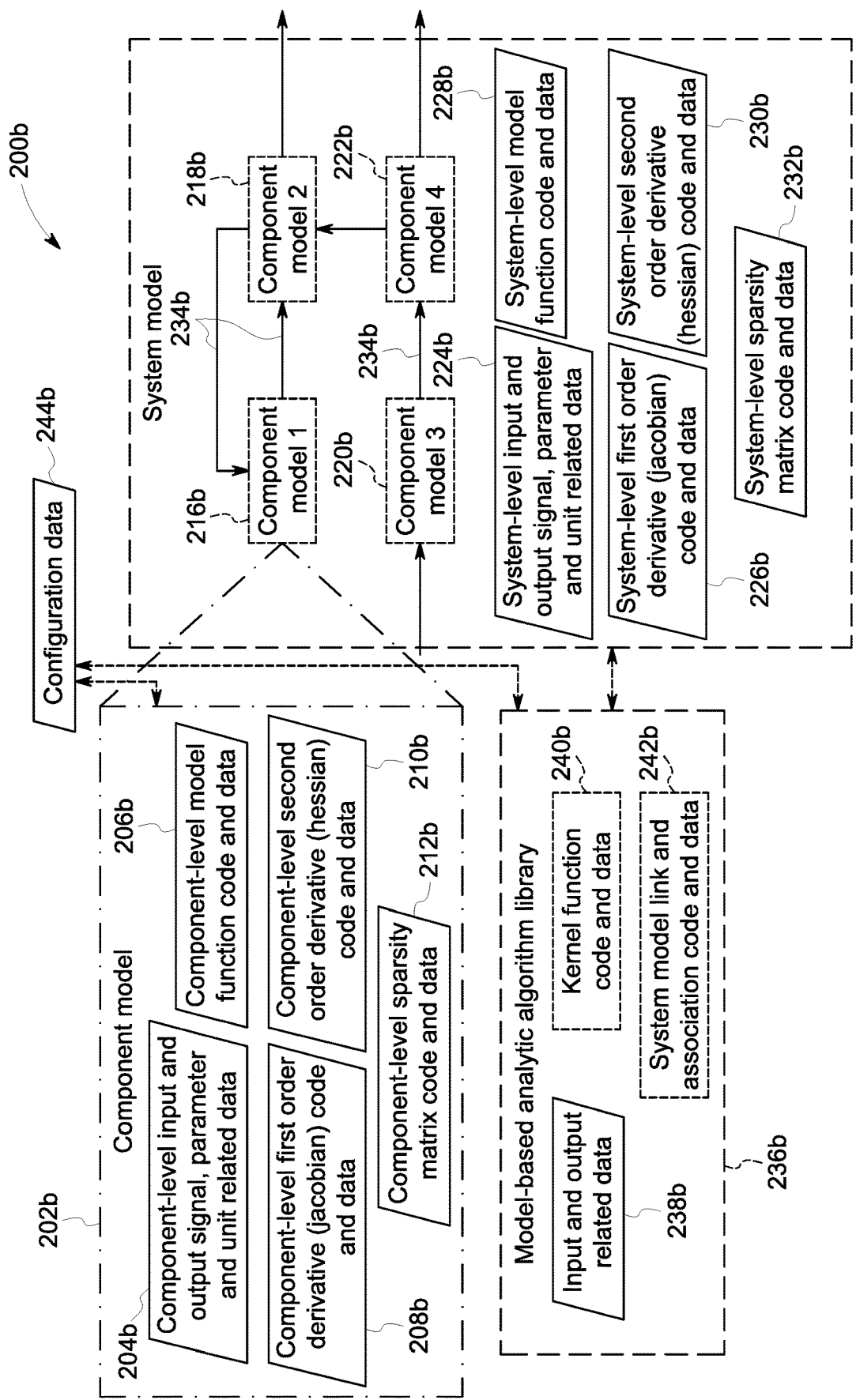
FIG. 2B is a block diagram illustrating exemplary software code and data structures corresponding to a model-based control solution including a component model, a system model, and a model-based analytic algorithm in accordance with an embodiment of the present invention.

FIG. 2B is a block diagram 200b illustrating the logical relationship between the component model 202b, the system model 214b, the model-based analytic algorithm 236b, and configuration data 244b to form the model-based control solution generated in accordance with the embodiment of FIG. 2A. The block diagram 200b is generally representative of object code and data that substantially enable implementation of the model-based control solution. Reference numeral 202b refers to a component model implemented in a computer code. The component model 202b may include component-level input and output parameter and unit-related data 204b. The component model 202b may also include computer code and data related to the component model function 206b. Further, the component model 202b may include computer code and data corresponding to component-level first-order derivative (Jacobian) functions and values 208b, component-level second-order derivative (Hessian) functions and values 210b, and component-level sparsity matrices 212b. It may be noted that the component model may incorporate any number of variations, alterations, substitutions or equivalent arrangements not heretofore described, but which are commensurate with the scope of the component model.

Blocks 216b, 218b, 220b, and 222b are generally representative of component models that are included in the system model 214b. The component models 216b, 218b, 220b and 222b are interconnected to each other. Such interconnections may be modeled by computer code. Also, interconnection information may be obtained from metadata and other configuration information from the configuration data 244b. Additionally, system model 214b may also include system-level input and output parameter data 224b, system-level model function code and data 228b, code and data corresponding to system-level first-order derivative (Jacobian) functions and values 226b, code and data corresponding to system-level second-order derivative (Hessian) functions and values 230b, and system-level sparsity matrix code and data 232b.

The system model 214b is linked to or associated with a model-based analytic algorithm 236b. The model-based analytic algorithm 236b may include algorithm input and output related data 238b, and code and data corresponding to the model-based analytic algorithm kernel function 240b. Further, block 242b is representative of the computer code and data which links or associates the system model 214b with the model-based analytic algorithm 236b. The model-based analytic algorithm 236b is also linked to configuration data 244b.

As described hereinabove, the model-based control solution computer code and data structures may be deployed at the industrial control subsystem 126. The deployment of the model-based control solution is described in greater detail with reference to FIG. 3B.

As previously noted, at step 204, the system model is defined by interconnecting a first set of component models. The MBCDS 104 is configured to obtain information of each component model of the first set of component models and combine the obtained information to generate the corresponding system model information. The use of pre-compiled component model runtimes enables the combination and interconnection of the component models to build the system model. The configuration data specifying the interconnection corresponding to each component model of the first set of component models enable this combination and interconnection. Additionally, one or more computations, for example, first and second-order derivatives and sparsity matrices corresponding to the system model are performed to complete the interconnection process of the individual component models.

Figure 3A:
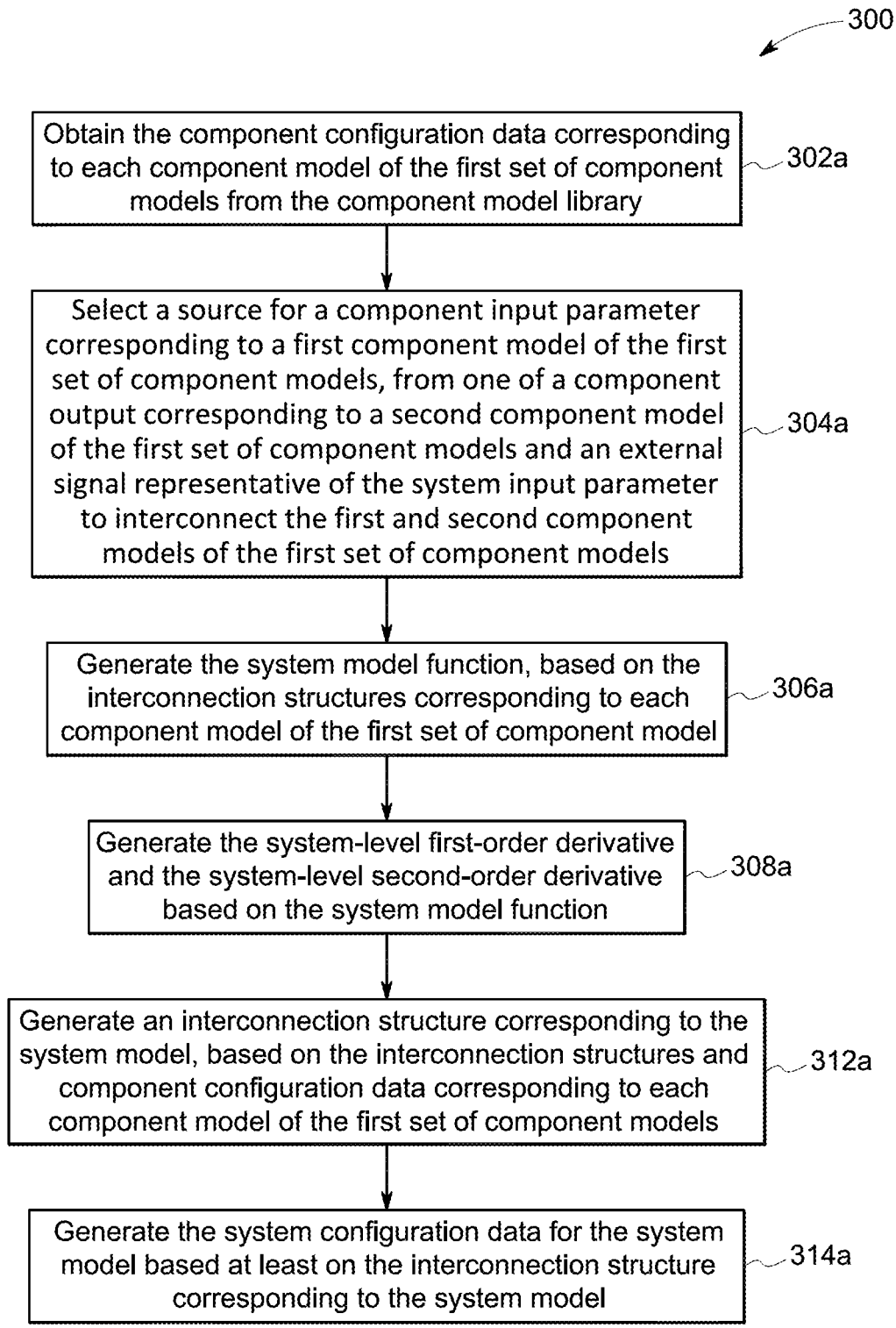
FIG. 3A is a flowchart illustrating a method to interconnect a set of component models to define a system model in accordance with an embodiment of the present invention.

Referring to FIG. 3A, a flowchart illustrating a method 300 to build the system model by interconnecting the first set of component models is presented, in accordance with aspects of the present specification. The method 300 is described with reference to FIG. 1B and the step 204 of the method 200. In certain embodiments, various steps of the method 300 may be performed by the processor sub-unit 120 and the memory sub-unit 122 in conjunction with MBCDS 104. At step 302a, the configuration data corresponding to each component model of the first set of component models are obtained from the component model library 112. At step 304a, a source for a first component input parameter for a first component model of the first set of component models is selected. The source includes one of a second component output corresponding to a second component model of the first set of component models or an external signal representative of the system input parameter corresponding to the system model. It may be noted that step 304a may be iterated for each component model of the first set of component models. Further, it may also be noted that the first component model adopts the role of the "receiving" component model and the second component model adopts the role of the "source" component model, in the description of the interconnection step with reference to step 204 of the method 200 described hereinabove.

At step 306a, the system model function corresponding to the system model is generated based on the configuration data corresponding to each component model of the first set of component models. In one embodiment, the configuration data corresponding to the first component model of the first set of component models may include, but not be limited to, an identification number of the component input parameter corresponding to the first component model, an identification number of the first component model, an identification number of a type of a signal of the second component model of the first set of component models, an identification number of the second component model, and an identification of the signal number of the second component model. Subsequently, at step 308a, the system-level first-order derivative and the system-level second-order derivative are generated based on the system model function. As previously noted, the system-level first-order and second-order derivatives correspond to the values obtained by evaluating the first and second order derivative functions of the system model function.

In certain embodiments, interconnection of the system model may be determined based on the configuration data corresponding to each component model of the first set of component models. In such embodiments, the configuration data may include, but not be limited to, numerical values of component model parameters, type of sensors, and sensor quality and location corresponding to the component models, type of actuators, actuator quality and location corresponding to the component models, a type of control algorithm corresponding to the component model function, tuning parameters for the control algorithms, type of estimation algorithm corresponding to the component model function, constrained signals, type of constraints, constrained values, and the like. Subsequently, at step 312a, an interconnection structure corresponding to the system model is generated via the MBCDS 104, based on the configuration data corresponding to each component model of the first set of component models. Thereafter, the system configuration data for the system model is generated based on the interconnection structure corresponding to the system model, as indicated at step 314a.

Figure 3B:
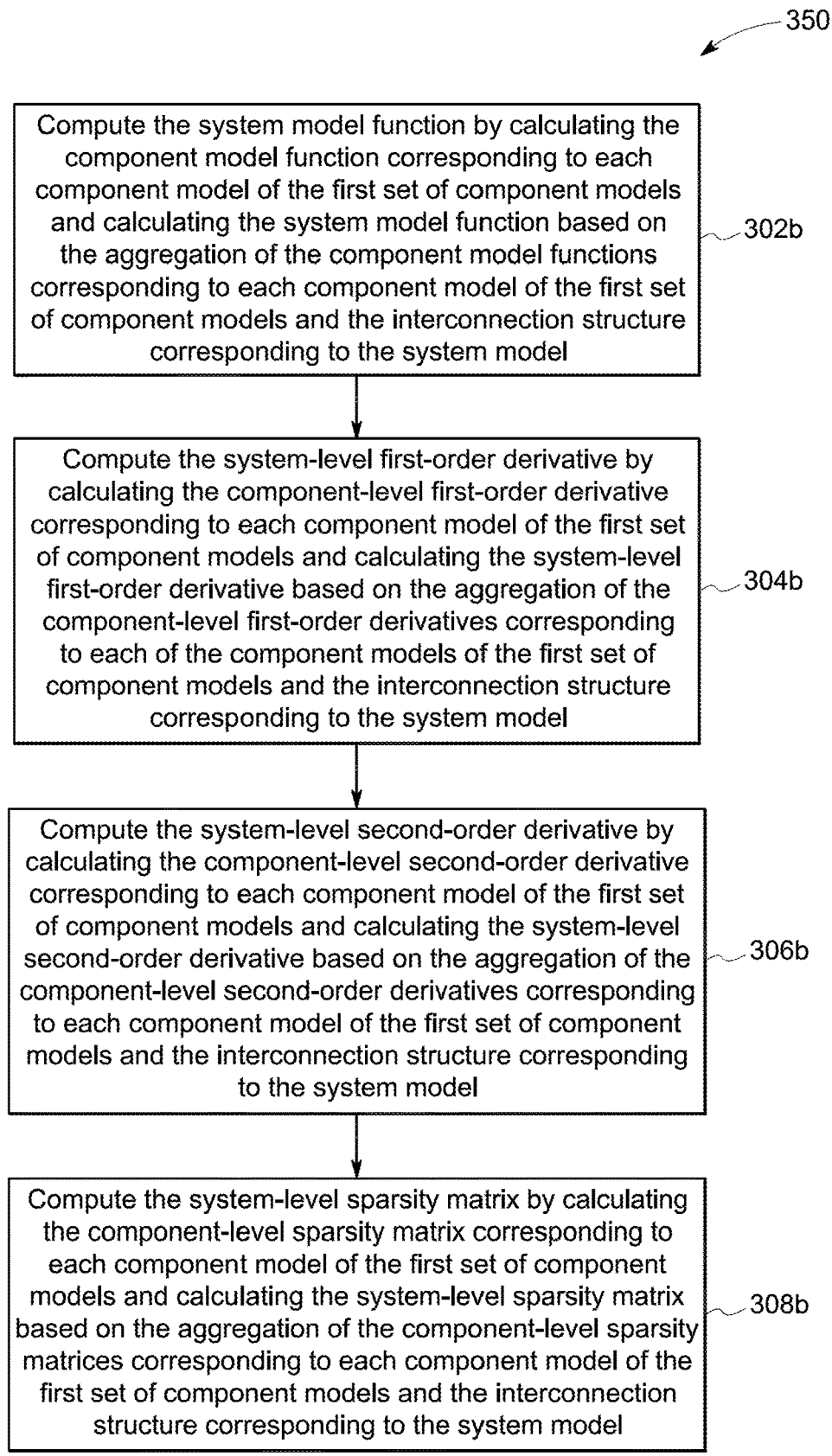
FIG. 3B is a flowchart illustrating a method to deploy and execute a model-based control solution on an industrial control subsystem in accordance with an embodiment of the present invention.

Referring to FIG. 3B, a flowchart, illustrating a method 350 for executing the model-based control solution is shown in accordance with the present specification. More specifically, further details of step 212 are described herein with reference to FIG. 1B and FIG. 2. In one embodiment, steps 302b-308b of the method 350 are executed by the industrial control subsystem 126. It should be noted herein that steps 302b-308b are iterated for each component model of the first set of component models of the system model at the time of the execution of the model-based control solution. At step 302b, the system model function is computed by calculating the component model function corresponding to each component model of the first set of component models. The system model function is calculated based on aggregation of the component model function corresponding to each component model of the first set of component models and the interconnection structure corresponding to the system model. Subsequently, at step 304b, the system-level first-order derivative corresponding to the system model is computed by calculating the component-level first-order derivative corresponding to each component model of the first set of component models and aggregating the component-level first-order derivative corresponding to each of the component models of the first set of component models and the interconnection structure corresponding to the system model. Further, at step 306b, the system-level second-order derivative corresponding to the system model is computed by calculating the component-level second-order derivative corresponding to each component model of the first set of component models and aggregating the component-level second-order derivative corresponding to each component model of the first set of component models and the interconnection structure corresponding to the system model. Finally, at step 308b, the system-level sparsity matrix is computed by calculating the component-level sparsity matrix corresponding to each component model of the first set of component models and calculating the system-level sparsity matrix based on the aggregation of the component-level sparsity matrices corresponding to each component model of the first set of component models and the interconnection structure corresponding to the system model.

As previously disclosed, the configuration data 118 may be obtained via the MBCDS 104 at a time instant of the defining the system model. By way of example, the configuration data 118 may be in the form of an eXtensible Markup Language (XML) document. In certain embodiments, the configuration sub-unit 116 may be configured to generate XML templates for the configuration data 118 corresponding to each component model of the first set of component models. The configuration sub-unit 116 is configured to generate XML templates for the system configuration data corresponding to the system model. The system configuration data and the model-based control solution runtime are deployed in the industrial control subsystem 126. The configuration data 118 may be retrieved by the industrial control subsystem 126 statically or dynamically during execution of the model-based control solution. Generation of the configuration data 118 corresponding to each component model and the system model enables the configuration sub-unit 116 to reuse pre-compiled runtimes while obviating the need for recompilation of the software code corresponding to each component model.

In certain scenarios, there may be a need to generate a new component model or a new model-based analytic algorithm.

In one embodiment, the autocode generation sub-unit 114 is configured to process symbolic component model equations obtained from the MBCDS 104 to generate executable code corresponding to the component model equations. In certain embodiments, the autocode generation sub-unit 114 may be configured to include a symbolic framework for algorithmic differentiation and numeric optimization, for example, CasADi, developed by Optimization in Engineering Center (OPTEC), Mathematica, Modelica, Mathworks Symbolic Toolbox, Automatic Differentiation by Overloading in C++ (ADOL-C) and the like.

In certain other embodiments, the autocode generation sub-unit 114 may also be configured to process manually written code for model equations. In such embodiments, a user writes equations within a target computer language, such as C, C++ or Fortran, corresponding to a computer language in which code for a target system is generated. Further, the autocode generation sub-unit 114 is configured to provide a language or input format to describe the model equations. Additionally, the autocode generation sub-unit 114 is configured to create constructs required for the target language based on the model meta-data describing the variables, thereby creating place-holders wherein a user is enabled to substitute equations in the desired syntax of the target language. In case of frequently used meta-data, the autocode generation sub-unit 114 may also be configured to pre-initialize the corresponding constructs using required values and calculations, thereby simplifying the user task of manually defining the equations. By way of example, the meta-data may include dimensions of arrays and commonly used data elements. Accordingly, the autocode generation sub-unit 114 may define and initialize the arrays in the target language. Further, the autocode generation sub-unit 114 may validate and verify the initialization, allocation, and deletion of variables in various functions of the target code, thereby improving memory management and avoiding memory leaks. In another example, the autocode generation sub-unit 114 may be configured to create lookup tables for a particular class of objects, by creating objects and using variables related to the table to correctly initialize internal data structures defining the table.

The symbolic framework for algorithmic differentiation included in the autocode generation sub-unit 114 allows users to construct symbolic expressions including either scalar or sparse matrix valued operations. Such symbolic expressions can then be efficiently differentiated using algorithms to generate large and sparse first-order derivatives, for example, Jacobians, and second-order derivatives, for example, Hessians.

Figure 4:
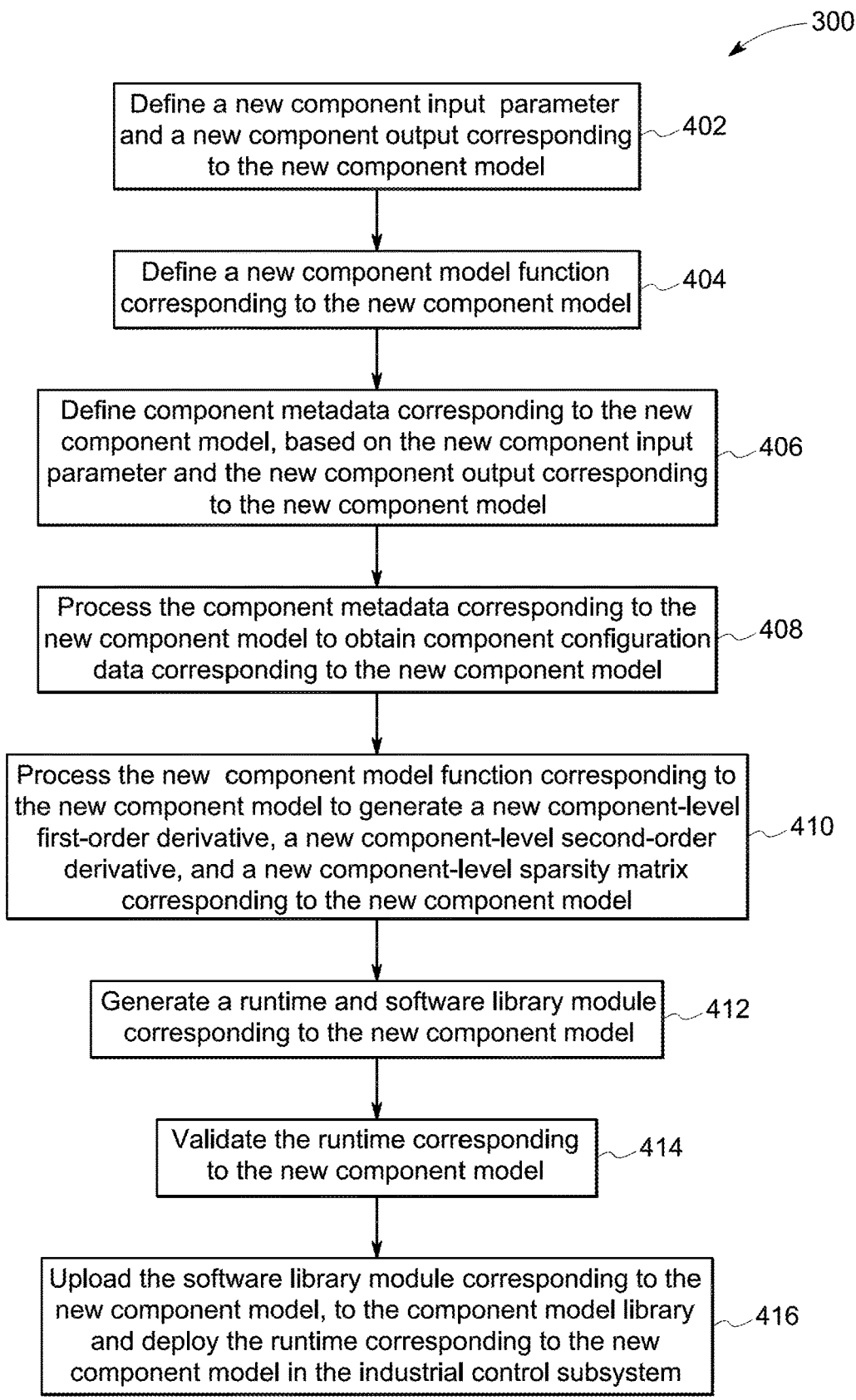
FIG. 4 is a flowchart illustrating a method to build a new component model software library module and runtime in accordance with an embodiment of the present invention.

Turning now to FIG. 4, a flowchart illustrating a method 400 to build a new component model is shown in accordance with aspects of the present specification. The new component model refers to a component model that is hitherto not available in the component model library 112. The new component model may be defined by a user via the MBCDS 104. The method 400 is described with reference to FIG. 1B and FIG. 2. In certain embodiments, various steps of the method 400 are performed by the processor sub-unit 120 and the memory sub-unit 122 in conjunction with the MBCDS 104, the autocode generation sub-unit 114, the configuration sub-unit 116, and the validation subsystem 124. More particularly, steps 402-406 of the method 400 are performed by the MBCDS 104 in conjunction with the processor sub-unit 120 and the memory sub-unit 122. Step 408 is performed by the configuration sub-unit 116. Steps 410-412 are performed by the autocode generation sub-unit 116, and step 414 is performed by the validation subsystem 124. Finally, step 416 is performed by the MBCDS 104 in conjunction with the processor sub-unit 120 and the memory sub-unit 122.

At step 402, a user interacts with the MBCDS 104, to define a new component input parameter and a new component output corresponding to the new component model. At step 404, a new component model function corresponding to the new component model is defined via the MBCDS 104. At step 406, component metadata corresponding to the new component model is defined based on the new component input parameter and the new component output corresponding to the second component model via the MBCDS 104. At step 408, the component metadata corresponding to the new component model is processed by the configuration sub-unit 116 to obtain component configuration data corresponding to the new component model. Further, the new component model function corresponding to the new component model is processed by the autocode generation subunit 114 to generate a new component-level first-order derivative, a new component-level second-order derivative, and a new component-level sparsity matrix corresponding to the new component model, as indicated by step 410. Furthermore, a runtime and software library module corresponding to the new component model are generated via the autocode generation subunit 114 as indicated at step 412. At step 414, the runtime corresponding to the new component model is validated by the validation subsystem 124. Finally, at step 416, the software library module corresponding to the new component model is uploaded to the component model library 112 via the MBCDS 104. The runtime corresponding to the new component model is deployed in the industrial control subsystem 126.

As previously disclosed, there may be a need to upload a second model-based analytic algorithm runtime into the model-based analytic algorithm library 110. The second model-based analytic algorithm refers to a new model-based analytic algorithm defined by a user via the MBCDS 104 and hitherto not available in the model-based analytic algorithm library 110. Model-based analytic algorithms may include estimation functions, simulation functions, control functions, optimization functions, or combinations thereof. Some non-limiting examples of estimation functions may include an Extended Kalman Filter (EKF), an Unscented Kalman Filter (UKF), and a Gauss-Newton Filter. Some non-limiting examples of control functions may include a feed-forward function, a robust control function, a dynamic inversion function, a gain scheduling function, a linear quadratic regulator function and the like. Furthermore, some non-limiting examples of optimization functions may include a non-linear model predictive control function, a linear model predictive control function, and a static optimization function.

Figure 5:
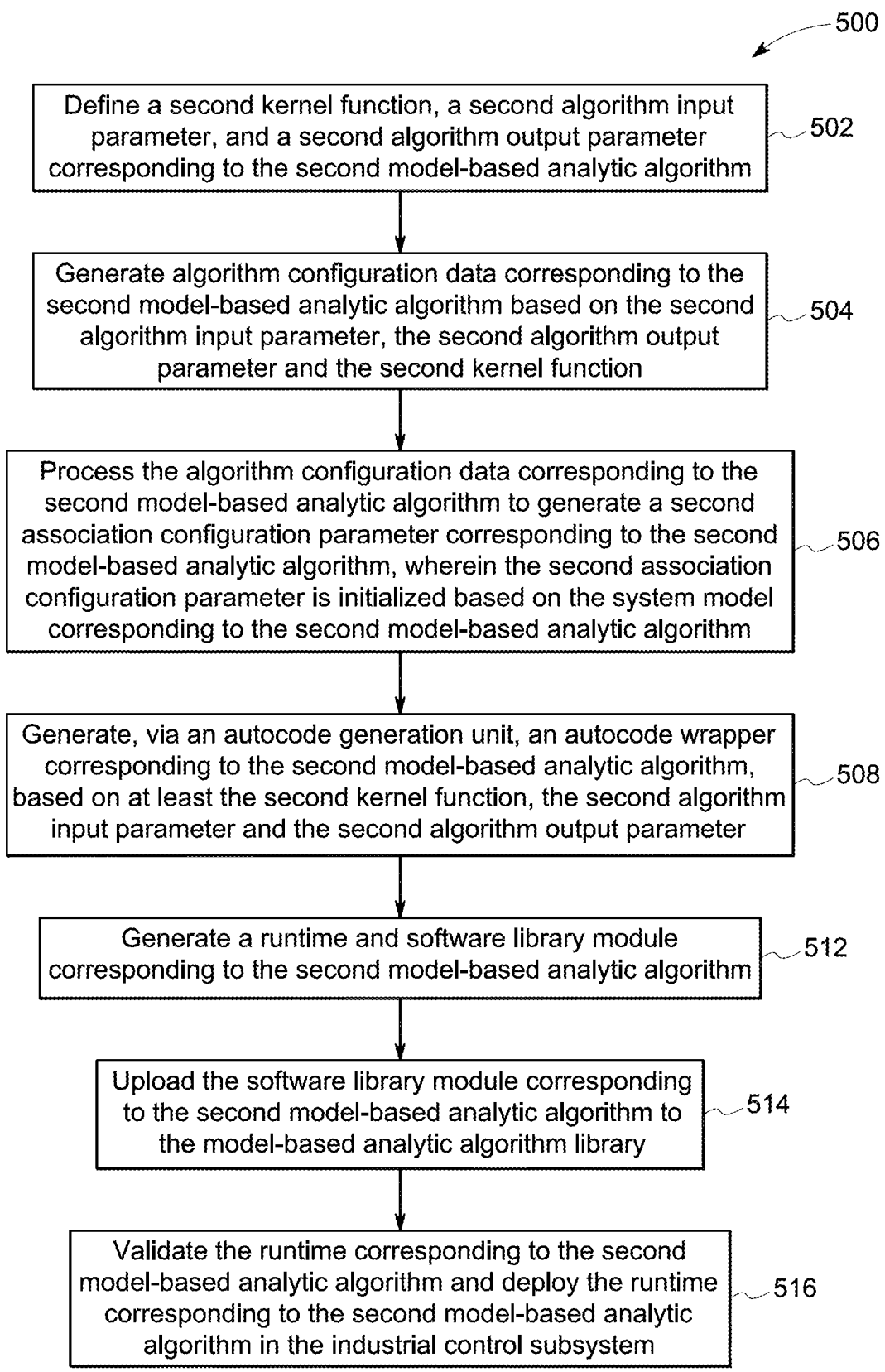
FIG. 5 is a flowchart illustrating a method to build a new analytic algorithm software library module and runtime in accordance with an embodiment of the present invention.

With reference to FIG. 5, a flowchart illustrating a method 500 to build a second model-based analytic algorithm runtime is shown in accordance with aspects of the present specification. The method 500 is described with reference FIG. 1B and FIG. 2. In certain embodiments, various steps of the method 500 are performed by the processor sub-unit 120 and the memory sub-unit 122 in conjunction with the MBCDS 104, the autocode generation sub-unit 114, the configuration sub-unit 116, and the validation subsystem 124. More particularly, steps 502-504 of the method 500 are performed by the MBCDS 104 in conjunction with the processor sub-unit 120 and the memory sub-unit 122. Step 506 is performed by the configuration sub-unit 116. Steps 508-510 are performed by the autocode generation sub-unit 114 and step 512 is performed by the validation subsystem 124. Finally, steps 514-516 are performed by the MBCDS 104104 in conjunction with the processor sub-unit 120 and the memory sub-unit 122.

At step 502, a user interacts with the MBCD 104 to define a second kernel function, a second algorithm input parameter, and a second algorithm output parameter corresponding to the second model-based analytic algorithm. Subsequently at step 504, algorithm configuration data corresponding to the second model-based analytic algorithm is generated via the MBCDS 104, based on the second algorithm input parameter, the second algorithm output parameter and the second kernel function corresponding to the second model-based analytic algorithm. Algorithm configuration data corresponding to the second model-based analytic algorithm is processed via the configuration subunit 116 to generate a second association configuration parameter corresponding to the second model-based analytic algorithm. The second association configuration parameter is initialized based on the system model corresponding to the second model-based analytic algorithm, as indicated at step 506. Subsequently, at step 508, an autocoded wrapper corresponding to the second model-based analytic algorithm is generated via the autocode generation sub-unit 114, based on the second kernel function, the second algorithm input parameter, and the second algorithm output parameter corresponding to the second model-based analytic algorithm. Further, at step 510, a runtime and a software library module corresponding to the second model-based analytic algorithm is generated via the autocode generation sub-unit 114. The runtime corresponding to the second model-based analytic algorithm is subsequently validated via the validation subsystem 124, as indicated by step 512. Furthermore, at step 514, the software library module corresponding to the second model-based analytic algorithm is uploaded, via MBCDS 104, to the model-based analytic algorithm library 110. Finally, at step 516, the second model-based analytic algorithm runtime is deployed in the industrial control subsystem 126.

The exemplary systems and methods associated with model-based control platforms for industrial control systems presented hereinabove provide an enhanced and flexible software architecture that allows a combination of component models to build model-based control (MBC) solutions, obviating the need to resort to low-level programming, compiling or code generation. Advantageously, the model-based control platform 102 recovers the modularity and flexibility characteristic of programmable logic controller (PLC) languages to facilitate implementation of MBC solutions in industrial assets.

Figure 6:
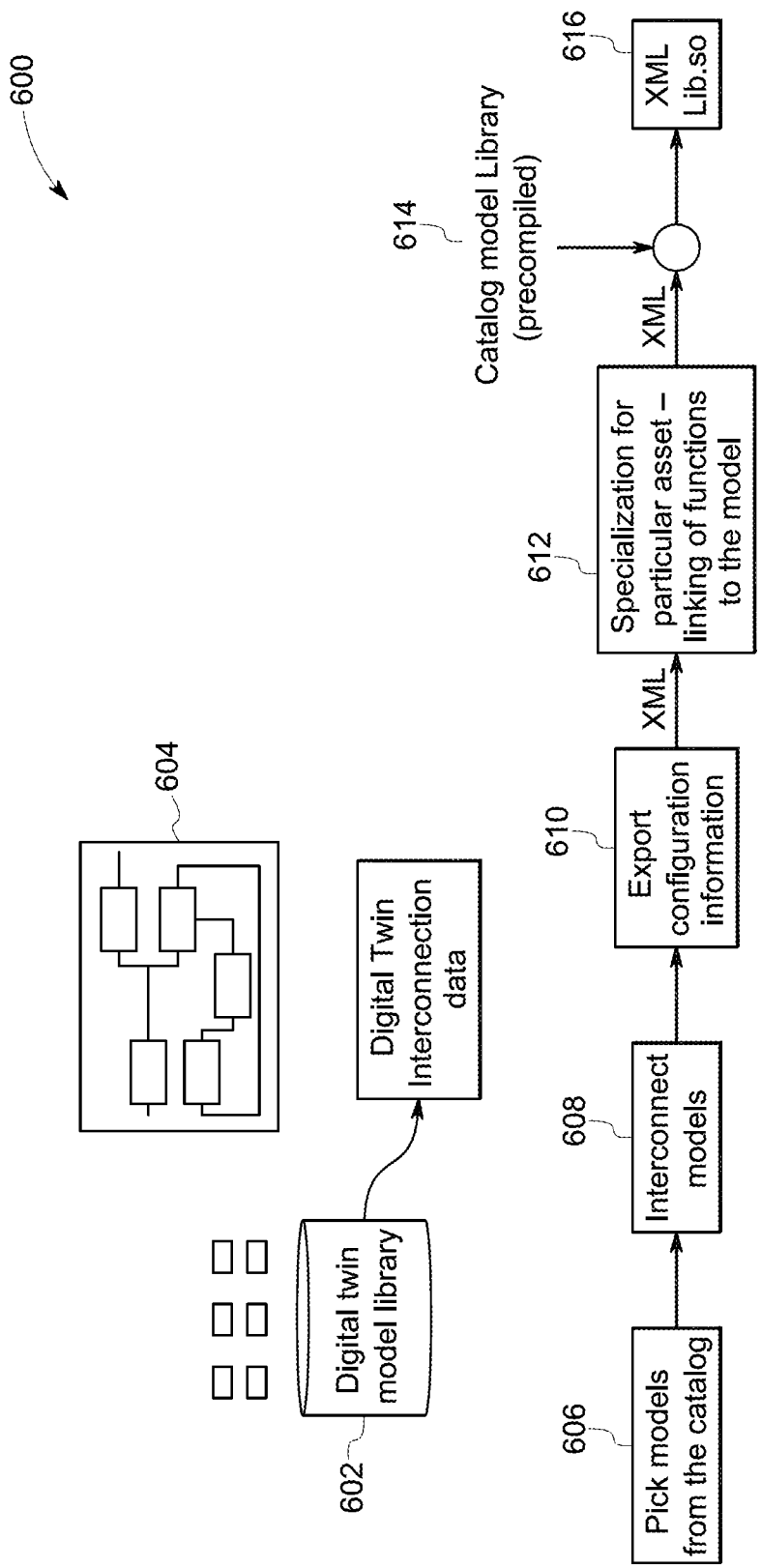
FIG. 6 is a block diagram of an exemplary workflow illustrating a process of building a model-based control solution for a digital twin model in accordance with an embodiment of the present invention.

With reference to FIG. 6, an exemplary workflow 600 illustrating a process of building a model-based control solution for a digital twin model is shown in accordance with aspects of the present specification. The workflow 600 is described with reference to FIG. 1B and FIG. 2.

Reference numeral 600 is generally representative of a workflow entailing the steps of creating a model-based control solution for a digital twin model. A digital twin may be a high fidelity digital replica or dynamic model of an asset. Some non-limiting examples of assets include gas turbines, aircraft engines, locomotives, and the like. A digital twin may also be a high fidelity digital replica or dynamic model of a process. Digital twins may be used to continuously gather data and generate insights, thereby enabling to manage industrial assets. A digital twin may leverage contextual data from sensors to represent near real-time status and operational conditions of an asset such as, but not limited to, a gas turbine, an aircraft engine, a locomotive and the like, or process. A digital twin may be used to estimate a remaining useful life of a twinned physical system using sensors, communications, modeling, history, and computation. The digital twin may provide an indication or a projected occurrence of a failure event or a sub-optimal operation in a time frame that is meaningfully prior to the actual occurrence of the failure event or sub-optimal operation. The digital twin may include a code object having parameters and dimensions corresponding to the physical twin's parameters and dimensions. The digital twin updates values of the parameters and dimensions based on contextual data received from the sensors associated with the physical twin. The digital twin may include a real-time efficiency and life consumption state estimation device. The digital twin may also include a specific or "per asset" portfolio of system models and asset-specific sensors. The digital twin may receive inspection and/or operational data and track a single specific asset over a lifetime based on observed data and determined state changes. Some digital twin models may include a functional or mathematical form that is the same for like asset systems, but will have tracked parameters and state variables that are specific to each individual asset system. The insights gained from analysis of contextual data and use of a digital twin may be used for design changes to improve asset components and parts such as, but not limited to, the blades of a gas turbine, the compressor of an aircraft engine, and the like, or process parameters, such as, but not limited to, the efficiency, reliability, flexibility and the like.

Reference numeral 602 is generally representative of a model library for component modules corresponding to various components of a digital twin model. By way of example, the model library 602 may include component models corresponding to various parts and processes of a gas turbine in a power generation plant. A digital twin model may be a model of the gas turbine. Block 604 is a graphical depiction of component models of the digital twin interconnected to form a digital twin system model, based on interconnection data obtained from the digital twin model library. At step 606, component models may be selected from a model catalog (not shown). In one example, a graphical representation of the model catalog may be displayed to a user via the MBCDS 104. At step 608, the component models are interconnected to each other. In one embodiment, the MBCDS 104 may perform the step of interconnecting the component models. At step 610, the configuration sub-unit 108 performs the step of exporting configuration information corresponding to the component models and the system model to an XML file. The MBCDS 104 retrieves a model-based analytic algorithm from the model-based analytic algorithm library 110. Finally, at step 616, runtimes of the component models are retrieved from a catalog model library 614 and a dynamic linkable library (.so file) is created which is downloadable to the industrial control subsystem 126.

The foregoing examples, demonstrations, and process steps such as those that may be performed by the system may be implemented by suitable code on a processor-based system, such as a general-purpose or special-purpose computer. It should also be noted that different implementations of the present technique may perform some of or all the steps described herein in different orders or substantially concurrently, that is, in parallel. Additionally, the functions may be implemented in a variety of programming languages. Such code may be stored or adapted for storage on one or more tangible, machine readable media, such as on data repository chips, local or remote hard disks, optical disks (i.e., CDs or DVDs), memory or other media, which may be accessed by a processor-based system to execute the stored code. The tangible media may include paper or another suitable medium upon which the instructions are printed. For instance, the instructions may be electronically captured via optical scanning of the paper or other medium, then compiled, interpreted or otherwise processed in a suitable manner if necessary, and then stored in the data repository or memory device.

It is to be understood that not necessarily all such objects or advantages described above may be achieved in accordance with any particular embodiment. Thus, for example, those skilled in the art will recognize that the systems and techniques described herein may be embodied or carried out in a manner that achieves or improves one advantage or group of advantages as taught herein without necessarily achieving other objects or advantages as may be taught or suggested herein.

While the technology has been described in detail in connection with only a limited number of embodiments, it should be readily understood that the specification is not limited to such disclosed embodiments. Rather, the technology can be modified to incorporate any number of variations, alterations, substitutions or equivalent arrangements not heretofore described, but which are commensurate with the spirit and scope of the claims. Additionally, while various embodiments of the technology have been described, it is to be understood that aspects of the specification may include only some of the described embodiments. Accordingly, the specification is not to be seen as limited by the foregoing description, but is only limited by the scope of the appended claims.

The invention claimed is:

1. A method for building a model-based control solution, the method comprising:
   obtaining, via a model-based control definition sub-unit, a first set of component models from a component model library;
   defining, via the model-based control definition sub-unit, a system model by interconnecting the first set of component models;
   obtaining, via the model-based control definition sub-unit, a first model-based analytic algorithm from a model-based analytic algorithm library; and
   associating, via the model-based control definition sub-unit, the first model-based analytic algorithm with the system model to generate the model-based control solution;
   wherein the system model comprises:
      the first set of component models;
      a system input parameter corresponding to a system input signal;
      a system output comprising at least one of a system output parameter corresponding to a system output signal, a system-level continuous time state, a system-level discrete time state, and a system-level algebraic variable;
      a system model function comprising one of a system output function corresponding to the system output parameter, a system-level rate of change of continuous time state vector corresponding to the system-level continuous time state, a system-level discrete time update function corresponding to the system-level discrete time state, and a system-level algebraic constraint function corresponding to the system-level algebraic variable;
      system metadata corresponding to the system input parameter and the system output;
      system configuration data generated based on the system metadata;
      a system-level first-order derivative corresponding to the system model function;
      a system-level second-order derivative corresponding to the system model function; and
      a system-level sparsity matrix identifying non-zero values of the system-level first-order derivative or the system-level second-order derivative; and
   wherein each component model of the first set of component models comprises:
      a component input parameter corresponding to a component input signal;
      a component output comprising at least one of a component output parameter corresponding to a component output signal, a component-level continuous time state, a component-level discrete time state, and a component-level algebraic variable;
      a component model function comprising one of a component output function corresponding to the component output parameter, a component-level rate of change of continuous time state vector corresponding to the component-level continuous time state, a component-level discrete time update function corresponding to the component-level discrete time state, and a component-level algebraic constraint function corresponding to the component-level algebraic variable;
      component metadata corresponding to the component input parameter and the component output;
      component configuration data generated based on the component metadata;
      a component-level first-order derivative corresponding to the component model function;
      a component-level second-order derivative corresponding to the component model function; and
      a component-level sparsity matrix identifying non-zero values of the component-level first-order derivative or the component-level second-order derivative.

2. The method of claim 1, wherein interconnecting the first set of component models comprises:
   obtaining, via the model-based control definition sub-unit, the component configuration data corresponding to each component model of the first set of component models from the component model library;
   interconnecting a first and a second component model of the first of component models by selecting, via the model-based control definition sub-unit, a source for the component input parameter corresponding to the first component model of the first set of component models from one of the component output corresponding to the second component model of the first set of component models, and an external signal representative of the system input parameter;
   generating, via the model-based control definition sub-unit, the system model function, based on the component configuration data corresponding to each component model of the first set of component models;
   generating, via the model-based control definition sub-unit, the system-level first-order derivative based on the system model function; and
   generating, via the model-based control definition sub-unit, the system-level second-order derivative, based on the system model function.

3. The method of claim 2, further comprising:
generating, via a configuration sub-unit, an interconnection structure corresponding to the system model, based on the component configuration data corresponding to each component model of the first set of component models; and
generating, via the configuration sub-unit, the system configuration data corresponding to the system model based on the interconnection structure corresponding to the system model.

4. The method of claim 1, wherein the first model-based analytic algorithm comprises:
a first algorithm input parameter;
a first algorithm output parameter;
a first kernel function;
the system model;
a first association configuration parameter based on the system model; and
algorithm configuration data based on the first algorithm input parameter, the first algorithm output parameter, and the first kernel function.

5. The method of claim 4, wherein the first kernel function comprises one of:
a state estimation function comprising an Extended Kalman Filter (EKF), an Unscented Kalman Filter (UKF), and a Gauss-Newton Filter;
a control function comprising a feed-forward function, a linear quadratic regulator function, a robust control function, a dynamic inversion function and a gain scheduling function; and
an optimization function comprising a non-linear model predictive control function, a linear model predictive control function, and a static optimization function.

6. The method of claim 5, wherein associating the first model-based analytic algorithm with the system model comprises defining the algorithm configuration data corresponding to the first model-based analytic algorithm based on the system input parameter and the system output corresponding to the system model.

7. The method of claim 6, further comprising building a second model-based analytic algorithm by:
defining, via the model-based control definition sub-unit, a second kernel function, a second algorithm input parameter, and a second algorithm output parameter corresponding to the second model-based analytic algorithm;
generating, via the model-based control definition sub-unit, algorithm configuration data corresponding to the second model-based analytic algorithm based on the second algorithm input parameter, the second algorithm output parameter, and the second kernel function corresponding to the second model-based analytic algorithm;
processing, via the configuration sub-unit, the algorithm configuration data corresponding to the second model-based analytic algorithm to generate a second association configuration parameter corresponding to the second model-based analytic algorithm, wherein the second association configuration parameter is initialized based on the system model corresponding to the second model-based analytic algorithm;
generating, via the autocode generation unit, an autocoded wrapper corresponding to the second model-based analytic algorithm, based on the second kernel function, the second algorithm input parameter, and the second algorithm output parameter corresponding to the second model-based analytic algorithm;
generating, via the autocode generation sub-unit, a software library module and a runtime corresponding to the second model-based analytic algorithm;
validating, via the validation subsystem, the runtime corresponding to the second model-based analytic algorithm;
uploading, via the model-based control definition sub-unit, the software library module corresponding to the second model-based analytic algorithm to the model-based analytic algorithm library; and
deploying the runtime corresponding to the second model-based analytic algorithm on the industrial control subsystem.

8. The method of claim 1, further comprising:
validating, via a validation subsystem, the generated model-based control solution, via a simulation of the first model-based analytic algorithm and the system model; and
executing the generated model-based control solution, wherein executing the generated model-based control solution comprises:
computing, via an industrial control subsystem, the system model function by calculating the component model function corresponding to each component model of the first set of component models and calculating the system model function based on aggregation of the component model function corresponding to each component model of the first set of component models and the interconnection structure corresponding to the system model;
computing, via the industrial control subsystem, the system-level first-order derivative by calculating the component-level first-order derivative corresponding to each component model of the first set of component models and calculating the system-level first-order derivative based on aggregation of the component-level first-order derivative corresponding to each of component model of the first set of component models and the interconnection structure corresponding to the system model;
computing, via the industrial control subsystem, the system-level second-order derivative by calculating the component-level second-order derivative corresponding to each component model of the first set of component models and calculating the system-level second-order derivative based on aggregation of the component-level second-order derivative corresponding to each component model of the first set of component models and the interconnection structure corresponding to the system model; and
computing, via the industrial control subsystem, the system-level sparsity matrix by calculating the component-level sparsity matrix for each component model of the first set of component models and calculating the system-level sparsity matrix based on aggregation of the component-level sparsity matrix corresponding to each component model of the first set of component models and the interconnection structure corresponding to the system model.

9. The method of claim 1, further comprising:
defining, via the model-based control definition sub-unit, the system model by interconnecting a second set of component models wherein the second set of component models comprises a new component model, and wherein the new component model is built by:

defining, via the model-based control definition sub-unit, a new component input parameter and a new component output, corresponding to the new component model;

defining, via the model-based control definition sub-unit, a new component model function corresponding to the new component model;

defining, via the model-based control definition sub-unit, component metadata corresponding to the new component model, based on the new component input parameter and the new component output; and processing, via a configuration sub-unit, the component metadata corresponding to the new component model to obtain component configuration data corresponding to the new component model.

10. The method of claim 9, further comprising:

processing, via an autocode generation sub-unit, the new component model function corresponding to the new component model to generate a new component-level first-order derivative, a new component-level second-order derivative, and a new component-level sparsity matrix;

generating, via the autocode generation sub-unit, a runtime and a software library module corresponding to the new component model;

validating, via the validation subsystem, the runtime corresponding to the new component model;

uploading, via the model-based control definition sub-unit, the software library module corresponding to the new component model to the component model library; and deploying the runtime corresponding to the new component model in the industrial control subsystem.

11. A system comprising:
a model-based control platform comprising:
   a processor sub-unit;
   a memory sub-unit operatively coupled to the processor sub-unit;
   a component model library;
   a model-based analytic algorithm library; and
   a model-based control definition sub-unit operatively coupled to the processor sub-unit and configured to:
      obtain a first set of component models from the component model library;
      define a system model by interconnecting the first set of component models;
      obtain a first model-based analytic algorithm from the model-based analytic algorithm library; and
      associate the first model-based analytic algorithm with the system model to generate a model-based control solution;
a validation subsystem communicatively coupled to the model-based control platform, wherein the validation subsystem is configured to validate the generated model-based control solution, via a simulation of the model-based analytic algorithm and the system model; and
an industrial control subsystem communicatively coupled to the model-based control platform and configured to execute the model-based control solution based on validation of the generated model-based control solution; and wherein the system model comprises:
   the first set of component models;
   a system input parameter corresponding to a system input signal;
   a system output comprising at least one of a system output parameter corresponding to a system output signal, a system-level continuous time state, a system-level discrete time state, and a system-level algebraic variable;
   a system model function comprising one of a system output function corresponding to the system output parameter, a system-level rate of change of continuous time state vector corresponding to the system-level continuous time state, a system-level discrete time update function corresponding to the system-level discrete time state, and a system-level algebraic constraint function corresponding to the system-level algebraic variable;
   system metadata corresponding to the system input parameter and the system output;
   system configuration data generated based on the system metadata;
   a system-level first-order derivative corresponding to the system model function;
   a system-level second-order derivative corresponding to the system model function; and
   a system-level sparsity matrix identifying non-zero values of the system-level first-order derivative or the system-level second-order derivative; and wherein each component model of the first set of component models comprises:
   a component input parameter corresponding to a component input signal;
   a component output comprising at least one of a component output parameter corresponding to a component output signal, a component-level continuous time state, a component-level discrete time state, and a component-level algebraic variable;
   a component model function comprising one of a component output function corresponding to the component output parameter, a component-level rate of change of continuous time state vector corresponding to the component-level continuous time state, a component-level discrete time update function corresponding to the component-level discrete time state, and a component-level algebraic constraint function corresponding to the component-level algebraic variable;
   component metadata corresponding to the component input parameter and the component output;
   component configuration data generated based on the component metadata;
   a component-level first-order derivative corresponding to the component model function;
   a component-level second-order derivative corresponding to the component model function; and
   a component-level sparsity matrix identifying non-zero values of the component-level first-order derivative or the component-level second-order derivative.

12. The system of claim 11, wherein the model-based control definition sub-unit is further configured to:
obtain configuration data corresponding to each component model of the first set of component models;
select a source for the component input parameter corresponding to a first component model of the first set of component models from one of a component output corresponding to a second component model of the first set of component models and an external signal representative of the system input parameter to interconnect the first and second component models of the first of component models;

generate the system model function based on the configuration data corresponding to each component model of the first set of component models;
generate the system-level first-order derivative based on the system model function; and
generate the system-level second-order derivative based on the system model function.

13. The system of claim 11, wherein the first model-based analytic algorithm comprises:
a first algorithm input parameter;
a first algorithm output parameter;
a first kernel function;
the system model;
a first association configuration parameter based on the system model; and
algorithm configuration data based on the first algorithm input parameter, the first algorithm output parameter, and the first kernel function.

14. The system of claim 13, wherein the model-based control definition sub-unit is further configured to define the algorithm configuration data corresponding to the first model-based analytic algorithm based on the system input parameter and the system output corresponding to the system model.

15. The system of claim 13, wherein the model-based control definition sub-unit is further configured to:
define a second kernel function, a second algorithm input parameter, and a second algorithm output parameter corresponding to a second model-based analytic algorithm; and
generate algorithm configuration data corresponding to the second model-based analytic algorithm based on the second algorithm input parameter, the second algorithm output parameter, and the second kernel function corresponding to the second model-based analytic algorithm.

16. The system of claim 15, wherein the model-based control platform further comprises a configuration sub-unit configured to:
process the algorithm configuration data corresponding to the second model-based analytic algorithm to generate a second association configuration parameter corresponding to the second model-based analytic algorithm, wherein the second association configuration parameter is initialized based on the system model corresponding to the second model-based analytic algorithm.

17. The system of claim 16, wherein the model-based control platform further comprises an autocode generation sub-unit configured to:

generate an autocoded wrapper corresponding to the second model-based analytic algorithm, based on the second kernel function, the second algorithm input parameter, and the second algorithm output parameter corresponding to the second model-based analytic algorithm; and
generate a runtime and software library module corresponding to the second model-based analytic algorithm;
and wherein the model-based control definition sub-unit is further configured to
upload the software library module corresponding to the second model-based analytic algorithm to the model-based analytic algorithm library.

18. The system of claim 11, wherein the model-based control definition sub-unit is further configured to define a system model based on a second set of component models wherein the second set of component models comprises a new component model, and wherein the model-based control definition sub-unit is further configured to:
define a new component input parameter and a new component output corresponding to the new component model;
define a new component model function corresponding to the new component model; and
define component metadata corresponding to the new component model, based on the new component input parameter and the new component output.

19. The system of claim 18, wherein the system further comprises a configuration sub-unit and wherein the configuration sub-unit is configured to:
process the component metadata corresponding to the new component model to obtain component configuration data corresponding to the new component model.

20. The system of claim 19, wherein the system further comprises an autocode generation sub-unit, and wherein the autocode generation sub-unit is configured to:
process the new component model function corresponding to the new component model to generate a new component-level first-order derivative, a new component-level second-order derivative, and a new component-level sparsity matrix; and
generate a runtime and a software library module corresponding to the new component model;
and wherein the model-based control definition sub-unit is further configured to
upload the software library module corresponding to the new component model to the component model library.

* * * * *